US008751587B2

(12) United States Patent
Macken

(10) Patent No.: US 8,751,587 B2
(45) Date of Patent: Jun. 10, 2014

(54) REAL-TIME WEB APPLICATIONS

(75) Inventor: Luke J. Macken, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 632 days.

(21) Appl. No.: 12/626,497

(22) Filed: Nov. 25, 2009

(65) Prior Publication Data
US 2011/0125854 A1 May 26, 2011

(51) Int. Cl.
G06F 15/16 (2006.01)
(52) U.S. Cl.
USPC .......................... 709/206; 709/219
(58) Field of Classification Search
USPC ................. 709/206, 203, 204, 219, 220, 224; 715/772, 760, 764, 833, 864
See application file for complete search history.

(56) References Cited

U.S. PATENT DOCUMENTS

| 6,519,571 | B1 | 2/2003 | Guheen et al. |
| 6,826,595 | B1 | 11/2004 | Barbash et al. |
| 6,856,970 | B1 | 2/2005 | Campbell et al. |
| 6,987,987 | B1 | 1/2006 | Vacanti et al. |
| 7,062,511 | B1 | 6/2006 | Poulsen |
| 7,130,773 | B1 | 10/2006 | Wong |
| 7,321,883 | B1 | 1/2008 | Freedy et al. |
| 8,136,148 | B1 | 3/2012 | Chayanam et al. |
| 2001/0037494 | A1 | 11/2001 | Levien et al. |
| 2002/0052954 | A1 | 5/2002 | Polizzi et al. |
| 2002/0065038 | A1 | 5/2002 | Nawata |
| 2002/0109706 | A1 | 8/2002 | Lincke et al. |
| 2002/0129106 | A1 | 9/2002 | Gutfreund |
| 2002/0156693 | A1 | 10/2002 | Stewart et al. |
| 2003/0018951 | A1 | 1/2003 | Srivastava et al. |
| 2003/0046282 | A1 | 3/2003 | Carlson et al. |
| 2003/0084059 | A1 | 5/2003 | Kelley et al. |
| 2004/0107249 | A1 | 6/2004 | Moser et al. |
| 2005/0010877 | A1 | 1/2005 | Udler |
| 2005/0138426 | A1 | 6/2005 | Styslinger |
| 2005/0180352 | A1 | 8/2005 | Gerovski et al. |
| 2005/0273499 | A1 | 12/2005 | Goodman et al. |
| 2005/0278323 | A1 | 12/2005 | Horvitz et al. |
| 2006/0005163 | A1 | 1/2006 | Huesken et al. |
| 2006/0010390 | A1 | 1/2006 | Guido et al. |
| 2006/0168522 | A1 | 7/2006 | Bala |
| 2006/0200829 | A1 | 9/2006 | Astl et al. |
| 2006/0209868 | A1* | 9/2006 | Callaghan ..................... 370/428 |
| 2007/0033571 | A1 | 2/2007 | Moore et al. |
| 2007/0162501 | A1 | 7/2007 | Agassi et al. |
| 2007/0162570 | A1 | 7/2007 | Mathur et al. |
| 2007/0180227 | A1 | 8/2007 | Akimoto |
| 2007/0198534 | A1 | 8/2007 | Hon et al. |

(Continued)

OTHER PUBLICATIONS

Office Action mailed Jan. 19, 2011 for U.S. Appl. No. 12/626,502.

(Continued)

Primary Examiner — Ruolei Zong
(74) Attorney, Agent, or Firm — Lowenstein Sandler LLP

(57) ABSTRACT

A method and apparatus for providing real-time web applications is described. In one embodiment, the method includes obtaining data for a topic with a server computer system. The method may also include determining a client that is rendering a framework widget with a subscription to the topic. In one embodiment, the method may further include transmitting a message including the data from an application framework to the client to enable the framework widget to process the data, the message transmitted to the client without the client issuing a request for an update.

22 Claims, 9 Drawing Sheets

(56) References Cited

U.S. PATENT DOCUMENTS

| | | | |
|---|---|---|---|
| 2007/0250841 A1 | 10/2007 | Scahill et al. | |
| 2008/0028323 A1 | 1/2008 | Rosen et al. | |
| 2008/0082627 A1 | 4/2008 | Allen et al. | |
| 2008/0091686 A1 | 4/2008 | Beard | |
| 2008/0162848 A1 | 7/2008 | Broyles et al. | |
| 2008/0235258 A1 | 9/2008 | Chung et al. | |
| 2008/0250237 A1 | 10/2008 | Sebesta et al. | |
| 2008/0285091 A1 | 11/2008 | Skaaksrud et al. | |
| 2008/0288877 A1 | 11/2008 | Latzina et al. | |
| 2008/0294751 A1* | 11/2008 | Dreiling | 709/219 |
| 2009/0055749 A1 | 2/2009 | Chatterjee et al. | |
| 2009/0064247 A1* | 3/2009 | Biniak et al. | 725/105 |
| 2009/0172565 A1 | 7/2009 | Jackson et al. | |
| 2009/0249282 A1* | 10/2009 | Meijer et al. | 717/104 |
| 2009/0265355 A1 | 10/2009 | Chen et al. | |
| 2010/0005450 A1 | 1/2010 | Joy et al. | |
| 2010/0082659 A1 | 4/2010 | Reddy et al. | |
| 2010/0146060 A1 | 6/2010 | Graham | |
| 2010/0174577 A1 | 7/2010 | Duffy et al. | |
| 2010/0332703 A1 | 12/2010 | Ejiri | |

OTHER PUBLICATIONS

Red Hat, Inc. Non-Final Office Action for U.S. Appl. No. 12/626,502 mailed on Jan. 19, 2011.

Red Hat, Inc. Final Office Action for U.S. Appl. No. 12/626,502 mailed on Aug. 3, 2011.

USPTO, Notice of Allowance for U.S. Appl. No. 12/626,502 mailed Jan. 12, 2012.

USPTO, Non-Final Office Action for U.S. Appl. No. 12/626,482 mailed on Feb. 6, 2012.

USPTO, Notice of Allowance for U.S. Appl. No. 12/626,482 mailed on Jun. 29, 2012.

USPTO, Notice of Allowance for U.S. Appl. No. 12/626,502 mailed on Jan. 12, 2012.

USPTO, Non-Final Office Action for U.S. Appl. No. 12/626,471 mailed Apr. 20, 2012.

USPTO, Final Office Action for U.S. Appl. No. 12/626,471 mailed on Aug. 29, 2012.

USPTO, Advisory Action for U.S. Appl. No. 12/626,471 mailed on Nov. 5, 2012.

USPTO, Office Action for U.S. Appl. No. 12/626,471 mailed Dec. 19, 2012.

USPTO, Final Office Action for U.S. Appl. No. 12/626,471 mailed May 30, 2013.

USPTO, Notice of Allowance for U.S. Appl. No. 12/626,471 mailed Aug. 13, 2013.

USPTO, Notice of Allowance for U.S. Appl. No. 12/626,471 mailed Nov. 19, 2013.

USPTO, Office Action for U.S. Appl. No. 12/626,464 mailed Dec. 6, 2012.

USPTO, Notice of Allowance for U.S. Appl. No. 12/626,464 mailed Jul. 18, 2013.

USPTO, Corrected Notice of Allowance for U.S. Appl. No. 12/626,464 mailed Oct. 4, 2013.

USPTO, Notice of Allowance for U.S. Appl. No. 12/626,464 mailed Nov. 6, 2013.

USPTO, Office Action for U.S. Appl. No. 12/842,689 mailed Aug. 15, 2012.

USPTO, Final Office Action for U.S. Appl. No. 12/842,689 mailed Feb. 13, 2013.

* cited by examiner

REAL-TIME WEB APPLICATIONS

RELATED APPLICATIONS

This application is related to the co-pending applications entitled ARCHITECTURE, SYSTEM AND METHOD FOR PROVIDING REAL TIME WEB APPLICATION FRAMEWORK SOCKET concurrently filed on Nov. 25, 2009, U.S. patent application Ser. No. 12/626,46; ARCHITECTURE, SYSTEM AND METHOD FOR PROVIDING REAL TIME WIDGETS IN A WEB APPLICATION FRAMEWORK, concurrently filed on Nov. 25, 2009, U.S. patent application Ser. No. 12/626,471; ARCHITECTURE, SYSTEM AND METHOD FOR A MESSAGING HUB IN A REAL-TIME WEB APPLICATION FRAMEWORK, concurrently filed on Nov. 25, 2009, U.S. patent application Ser. No. 12/626,482; and ARCHITECTURE, SYSTEM AND METHOD FOR REAL-TIME WEB APPLICATION FRAMEWORK WITH A PLUG-IN ARCHITECTURE, concurrently filed on Nov. 25, 2009, U.S. patent application Ser. No. 12/626,502.

FIELD OF INVENTION

Embodiments of the invention relate to the field of web applications, and more particularly, to providing a real-time web application framework.

BACKGROUND OF THE INVENTION

Information is commonly exchanged over the internet via web applications run in web browsers. Often these applications intend to make web pages feel interactive by exchanging small amounts of data with a server acting on the other side of a client machine. The information exchange usually occurs when a web application requests data and/or requests updates from the server. Thus, web applications that obtain, display, and distribute data in real time incur computational expense and compute cycles at a client side web browser, in order to processes and issues requests. Furthermore, computing expenses are also consumed at a web server when handling and/or responding to web browser requests. Often the computational costs imposed on both the web browser and server computer are for naught, as new or updated data may not be available.

Furthermore, frameworks for creating these web applications require complex programming in JAVASCRIPT, AJAX, etc., as well as other web-based programming languages. Creating web applications and web components utilizing these technologies requires an applications programmer to have intricate knowledge of each technology, understand the protocols supported by each technology, and determine how to translate between disparate web components and communications protocols. The results are either overly complex web applications that require a significant amount of user time to develop, or web applications that do not support cross-platform/technology communications.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for providing real-time web applications is described. In one embodiment, the method includes obtaining data for a topic with a server computer system. The method may also include determining a client that is rendering a framework widget with a subscription to the topic. In one embodiment, the method may further include transmitting a message including the data from an application framework to the client to enable the framework widget to process the data, the message transmitted to the client without the client issuing a request for an update.

Figure 1A:
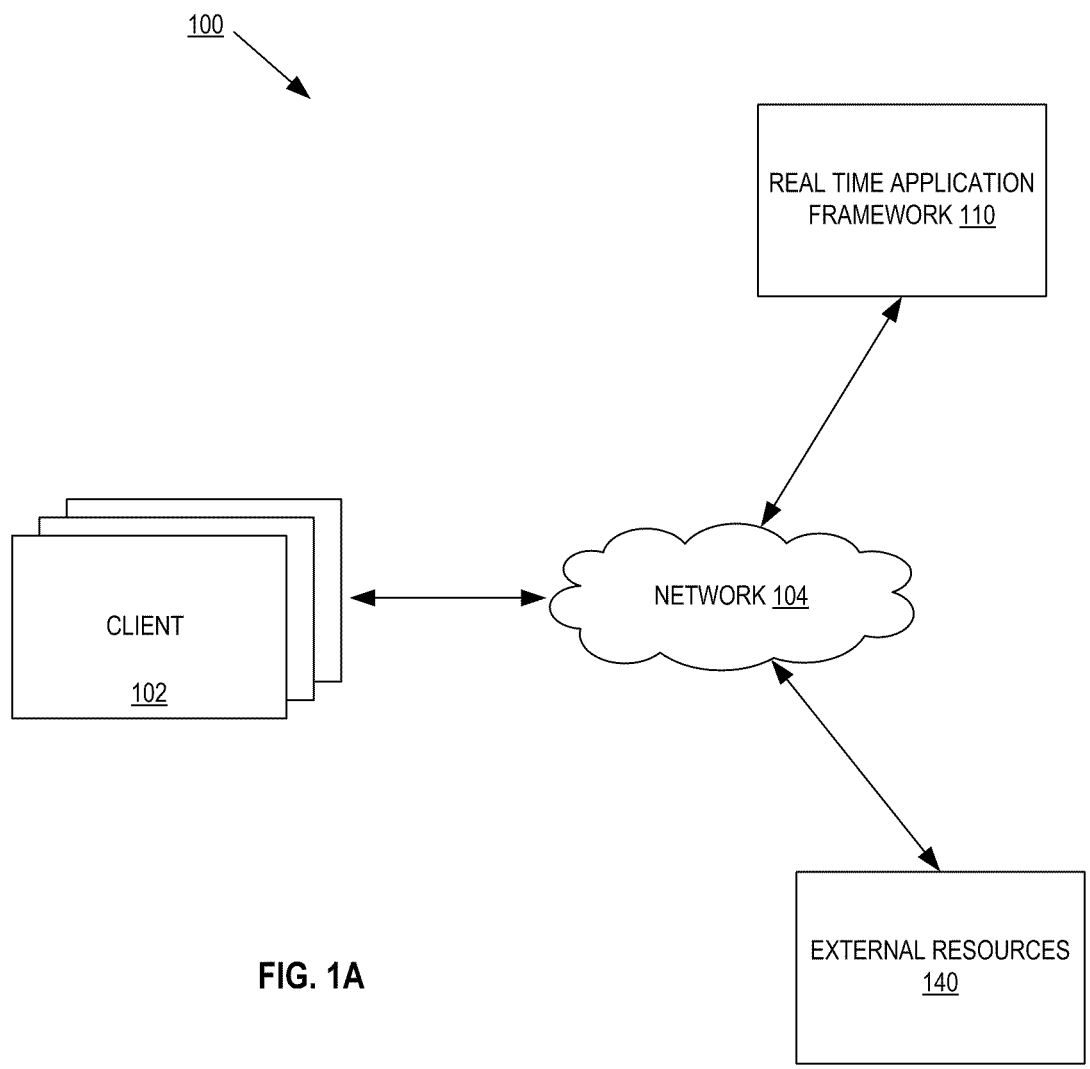
FIG. 1A is a block diagram of an exemplary system architecture for providing real-time web applications.

FIG. 1A is a block diagram of exemplary system architecture 100 for providing real-time web applications. In one embodiment, the system includes a real time application framework 110, clients 102, and external resources 140. The framework 110, external resources 140, and clients 102 may be coupled to a computer network 104 that communicates via any of the standard protocols for the exchange of information.

In one embodiment, real time application framework 110 is responsible for creating and distributing real-time web applications embedded in web pages, and for creating an environment for application programmers to create web applications. In one embodiment, the real time web applications include framework widgets provided to clients, such as client 102, from real time application framework 110. In one embodiment, a framework widget is a live web component that is updated in real time in response to receiving data messages, and processes the message in a graphical user interface of client 102. In one embodiment, the updates correspond to topic subscriptions of the framework widgets. In one embodiment, a topic is an abstraction of a messaging queue or message broker, and thus a framework widget subscribes to receiving data messages from the corresponding message queue or message broker.

In one embodiment, the data messages for given topics are obtained from external resources 140, or other resources connected to the network 104, and are distributed by the real time application framework 100 to the framework widgets currently rendered in a web page displayed by client 102. In one embodiment, the data messages are provided to the framework widgets without the framework widgets, a web browser of the client, or the client itself, issuing requests, polling the real time application framework, or otherwise proactively seeking updated data.

In one embodiment, in order to receive an initial web page, client 102 issues a request for a web page served by real time application framework 110. In one embodiment, the web page request is a standard hypertext transfer protocol (HTTP) request made to a web server of the real time application framework. In response to the request, real time application framework 110 responds with the requested web page. In one embodiment, the web page includes framework widgets for updating components of the web page in real time.

In one embodiment, as the web page including the framework widgets is provided to the client 102, real time application framework 110 further opens a framework socket 110 in client 102. In one embodiment, the framework socket is a live connection between the client and real time application framework 110. In one embodiment, the framework socket is referred to as live because the framework socket is persistently open while the web page is being displayed by client 102. Furthermore, the framework socket enables an open communications connection between client and real time application framework 110 through which different communications protocols, data messages, etc. may flow through. In one embodiment, the framework socket remains open to enable real time application framework 110 to provide data messages to framework widgets rendered in client 102 without receiving requests from the client and/or the framework widgets.

In one embodiment, real time application framework 110 obtains data in real time. In one embodiment, real time application framework 110 runs applications that poll external resources 140 over network 104 to determine if new and/or updated data is available at the external resources 104. In one embodiment, the applications are installed as plug-in applications on a server of the real time application framework 110. When new or updated data is available at the external resources 140, real time application framework 110 obtains the data for distribution to framework widgets. In one embodiment, real time application framework 110 obtains the data from external resources 110 as the data becomes available in real time.

In one embodiment, after real time application framework 110 obtains the data, real time application framework 110 pushes the data to client 102. In one embodiment, real time application framework includes a message broker, discussed below, which determines which clients are to receive the data message. The message broker then routes the data messages to the appropriate clients. In one embodiment, real time application framework 110 pushes the data to the framework widgets rendered in clients 102 via the live framework socket. As discussed herein, the persistent connection between the framework socket and the real time application framework 110 enables the framework 110 to deliver updated data to the clients without the clients proactively seeking the data. In one embodiment, responsive to receiving the updated data, the framework widgets rendered in client 102 further process the message for updating and displaying the updated data in a web page or web application displayed in client 102.

In one embodiment, real time application framework 110 continues to obtain updated data and distribute the updates to clients 102 in real time as updated data becomes available. The framework widgets rendered in the clients 102 continue to update as new data messages are received. As a result, the interaction between the framework widgets rendered in clients 102 and the framework 110 enable the creation, distribution, and running of real time web applications.

Figure 1B:
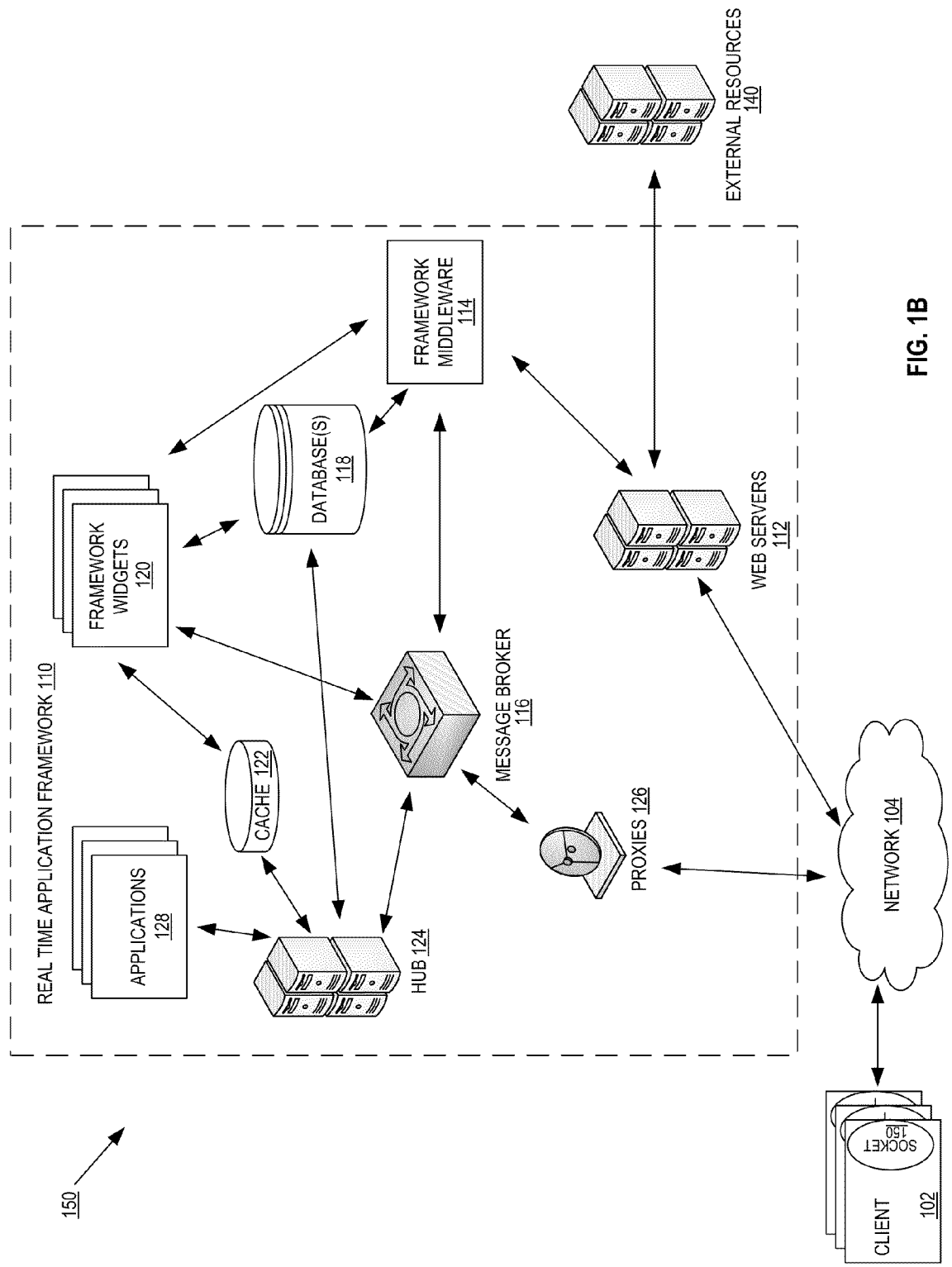
FIG. 1B is a block diagram of an exemplary system architecture for providing real-time web applications.

FIG. 1B is a block diagram of exemplary system architecture 150 for providing real-time web applications. System architecture 150 illustrates additional details, according to the embodiments discussed below, for architecture 100 discussed above in FIG. 1.

In one embodiment, the system 150 includes a real-time web application framework 110, external resources 140, and a plurality of clients 102. The framework 110 and external resources 140 may reside on the same or different machines (e.g., a server computer system, a gateway, a personal computer, etc.). The framework 110, external resources 140, and clients 102 may be coupled to a computer network 104 that communicates via any of the standard protocols for the exchange of information. They may run on one Local Area Network (LAN) and may be incorporated into the same physical or logical system, or different physical or logical systems.

Alternatively, the framework 110, external resources 140, and clients 102 may reside on different LANs that may be coupled together via the Internet but separated by firewalls, routers, and/or other network devices. In yet another configuration, the framework 110 and external resources 140 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, clients 102 are user computer systems that run standard web browsers for accessing the framework 110 as well as non-framework resources over the internet. The computer systems may run any web browser, such as FIREFOX, INTERNET EXPLORER, OPERA, etc. to access and interact with the framework 110. In one embodiment, the clients 102 issue requests to web servers 112 and receive web pages, for display in a web browser run on the clients 102. In one embodiment, the web pages include applications with real-time web components of the framework 110.

Framework 110 is responsible for providing interactive and real-time web applications, such as framework widgets 120 and applications 128, to clients 102 in response to web page requests issued by user systems. In one embodiment, the framework 110 leverages an open source web framework, such as PYTHON for deploying and integrating the various framework components discussed herein. In one embodiment, as will be discussed in greater detail below, framework widgets are self-contained live web applications updated in real-time and embedded in requested web page content. In one embodiment, the framework widgets are updated and perform various functions in the clients 102 in real time without requiring that additional requests and response be issued by the clients 102 and without requiring additional encoding of web content to make such requests. Examples of framework widgets include, but are not limited to, real-time acquisition and display of data feeds (e.g., news feeds from CNN, technical literature feeds, etc.), graphical user interface applications (e.g., graphs updated in real time), instant messaging, system resource monitoring, software update monitoring and notification, collaborative editing of a document with other users, communication between instances of framework widgets, communication between client computer systems, games, real time stock tickers, etc.

In one embodiment, web servers 112 of the framework 110 include one or more server computer systems that execute applications in a web stack (not shown). In one embodiment, the web servers are Web Server Gateway Interface (WSGI) servers that stack a plurality of web applications to build a web stack. In one embodiment, the web stack is a grouping of applications or layers that deliver a web solution (such as a graphical user interface system, enterprise system, framework 110, etc.). In one embodiment, the web application stack is a set of software applications run on the server 112 to support the development and deployment of websites, web applications, and web services. One example of a web application stack that may be managed by web servers 112 is PYTHON. PYTHON is a collection of packages or software modules that enable developers to write web applications or services without having to handle such low-level details as protocols, process/thread management, etc.

In one embodiment, the web servers 112 include a plurality of server computer systems coupled together for collectively processing the web applications stack and implementing the framework 110 discussed herein. In one embodiment, the web servers 112 also include computer systems (not shown) that are remote from web servers 112 and communicate over a network, such as network 104. In one embodiment, the web application stack includes web application layers such as authentication layer(s), authorization layer(s), caching layer(s), application or resource injection layer(s), etc.

In one embodiment, the web servers 112 receive requests from a clients 102 for non-framework web applications and web pages. Such requests are simply passed through the framework 110 to the corresponding requested external resource(s) 140. When the external resources 140 respond to the user system request, the framework forwards the requested content to the client 102. In another embodiment, the external resources 140 transmit the requested content directly to the requesting client bypassing the framework 110. In one embodiment, the client 102 connects and communicates to the external resources 140 through a framework proxy. In one embodiment, there is a bi-directional connection between the client 102 and the external resources 140 via proxies 126. In one embodiment, the external resources 140 communicate with the framework middleware 114 via web servers 112. In one embodiment, external resources 140 may further transmit messages to the message broker 116, for message distribution discussed below, if framework 110 exposes the message broker 116 to external resources 140.

In one embodiment, the framework 110 includes framework middleware 114. Although framework middleware 114 is illustrated outside the web servers 112, in one embodiment, the framework middleware 114 is one of the layers in the web application stack managed and executed by the web servers 112. Framework middleware 114 is one or more computer applications that connects software components or applications run in web servers 112. In one embodiment, the middleware consists of a set of services that allows multiple processes of the web applications stack running on one or more machines to interact, provide a web applications framework (such as framework 110), etc.

In one embodiment, framework middleware 112 may be used with existing web server applications. For example, framework middleware 12 may be added to an existing middleware application in a web application stack, such as a web stack including TURBOGEARS middleware that consists of several WSGI components such as PYLONS, SQLALCHEMY, GENSHI, and REPOZE. In one embodiment, the framework middleware 112 may be run by web servers 112 as a standalone platform for implementing the framework 110 as well as other middleware. In one embodiment, the standalone middleware stack includes application modules for profiling, resource compression, application dispatch/routing, session management, caching, widget resource injection, authentication, authorization, transaction management, error handling, registry management, and user supplied applications.

In one embodiment, the framework 110 includes framework widgets 120 and applications 128. In one embodiment, a framework widget is a reusable web component or class that bundles one or more of CSS, stylesheets, JAVASCRIPT, HTML, XML, etc. code to provide a live graphical user interface element and/or web application that can be updated in real-time without intervention of a client. In one embodiment, framework widgets are included or embedded within a web page requested by a clients 102 and supplied by the framework 110.

In one embodiment, when a framework widget 120 is delivered to a web page, framework middleware 114 injects framework socket 150 into the client 102. In one embodiment, the framework socket 150 is JAVASCRIPT code that connects to proxies 126. In one embodiment, the connection is a live (i.e., continuously open) communications pathway between the framework socket 150 opened within a web browser run on client 102 and the proxies 126 of the framework 110. In one embodiment, the live connection via the framework socket enables live data to be delivered directly to clients 102 without any additional actions performed by a web page displayed by client 102. In one embodiment, proxy 126 may reside on a dedicated machine or be part of web servers 112.

In one embodiment, the proxies 126 are proxies that provide a JavaScript/HTML socket, such as framework socket 150, in the clients 102. In one embodiment, the live connection provided by framework socket 150 enables execution of real-time web applications, such as chat rooms, instant messaging, live graphs, etc., without using any external plug-ins like FLASH or JAVA. In one embodiment, when a web page is loaded by a client 102, the framework socket 150 is opened automatically by the framework middleware 114 and connects, via the proxies 126, to a message broker 116.

In one embodiment, proxies 126 are a transport layer to enable the real-time exchange of data between the user systems 102 and message broker 116. In one embodiment, the proxies 126 are implemented as COMET SESSION PROTOCOL (CSP) proxies. In one embodiment, proxies 126 are a transport layer of framework 110 in which protocols can flow through. More specifically, the proxies 126 include a group of methods and protocols within a layered architecture of network components, within which the proxies 126 are responsible for encapsulating and translating between communications protocols application data blocks into data units (datagrams, segments) suitable for transfer to the framework infrastructure. In one embodiment, the proxies 126 are responsible for translating and communicating data from the clients 102, regardless of the web browser and corresponding supported protocols that are being used by the browser 102, for transmission to the message broker 116. In one embodiment, the proxies 126 are also responsible for managing the reverse transaction by abstracting network datagrams and delivering their payload to framework widgets run in a web browser on a user system 102. Examples of transport protocols supported by the proxies are TCP/IP, UDP, or implementations of web browser-targeted bi-directional stream-based protocols, such as CSP (Comet Session Protocol), In one embodiment, the message broker 116 is run on a server and is responsible for receiving, storing, and routing messages to and from clients 102. In one embodiment, the message broker 116 may include multiple message brokers that route data messages in different protocols or formats, such as advanced message queuing protocol (AMQP) and streaming text oriented messaging protocol (STOMP). In one embodiment, proxies 126 also support the AMQP and STOMP messaging protocols, and therefore translate between the data messages sent by the message brokers before receipt by the clients 102. STOMP is a text protocol designed to work with message oriented middleware. STOMP provides an interoperable wire format that enables STOMP clients to talk with STOMP message brokers. In one embodiment, the hub 124 also supports the AMQP and STOMP messaging protocols, and therefore enables translation between the data messages sent by the message brokers 116. In one embodiment, the hub 124 also translates after the applications 128 send messages, thus abstracting the underlying message protocol and delivery mechanisms from an application author.

In one embodiment, the message broker 116 runs on a web server computer 112. However, in one embodiment, message broker 116 could run on its own server computer system, a computer system remote from framework 110, a computer system that is deployed on a different framework, etc. In one embodiment, the data transport protocols supported by the proxies 126 enable a user's web browser to communicate with the message broker 116 in whatever protocol is supported by the user system. For example, in embodiments, the proxies 126 support the communications protocols of INTERNET EXPLORER, FIREFOX, OPERA, etc., and the different communications methods supported by each.

In one embodiment, proxies 126 provide protocol translation between clients 102 and the message broker 116. User web browsers run by clients 102 communicate via protocols implemented in JAVASCRIPT through the framework socket 150. In one embodiment, the framework socket 150 is an abstraction of the TCP socket in the proxies 126. In one embodiment, the framework socket 150 is also an abstraction of a TCP socket in JAVASCRIPT on a web browser run by a client 102. In one embodiment, clients 102 communicate utilizing the framework socket 150, via the proxies 126, to the message broker 116. In one embodiment, the framework socket 150 determines what web browser it is communicating with and opens an appropriate socket type to the proxies 126 to ensure a best level of communication possible, ensure that the framework socket remains live and open for as long as possible, etc. In one embodiment, the opening of a socket and establishing a link with the proxies 126 is transparent to a user, and the user does not know the socket is being opened.

In one embodiment, when framework widgets 120 are provided and rendered in a web application, each framework widget 120 registers with the framework middleware 114 as it passes through the framework 110 and prior to delivery to client 102. In one embodiment, the first framework widget to successfully establish a framework socket, as discussed above, provides the socket to the other framework widgets. For example, if there are three framework widgets on a web page, a first framework widget to render a framework socket on the requested web page would share the framework socket, so that each framework widget could communicate with the message broker 116 via the single framework socket. In one embodiment, the framework widget could also handle setting up and using the framework socket 150 behind the scenes, allowing the framework 110, as an API, to hide any necessary knowledge of the framework socket 150 from a developer of the framework widget.

In one embodiment, framework socket 150 connects with the proxies 126. In one embodiment, the framework widgets 120 register callback functions, to be processed by each framework widget, with the middleware 114. In one embodiment, the framework socket 150 then renders the pre-registered callbacks in JAVASCRIPT, and sends the callbacks back to clients 102. Thus, the framework widgets 120 are already registered with the framework socket 150 when the client 102 runs the response. In one embodiment, the callbacks are JAVASCRIPT functions that process messages received by the message broker 116. Once connected in the client 102, the callbacks for a framework widget are executed by the framework sockets 150 when appropriate (e.g., when a data message is received by a framework widget which triggers a callback function).

In one embodiment, framework widgets 120 subscribe to topics that the framework widget wants to "listen" to. In one embodiment, a topic is an abstraction of a message queue. Thus, a framework widget with a subscription to a topic might include, for example, a framework widget that receives data corresponding to a particular news feed, displays a graph updated in real-time, etc. When messages are received at the message broker 116 for a topic (e.g., data arrives at a message queue for distribution by the message broker), the data is sent by the message broker 116 via the proxies 126 to the framework sockets 150. In one embodiment, the framework sockets 150 correspond to framework widgets that have registered their subscription to the topic with the message broker 116. In one embodiment, the framework sockets 150 locally route, within a client 102, received data messages to the particular framework widgets 120 that subscribe to the data. In one embodiment, the web browser executes JAVASCRIPT code run by the framework socket 150 on behalf of the widget to route the received data messages.

For example, when a message arrives at the message broker 116, the message broker 116 sends the message through the proxies 116 to the web browsers 102 run on user systems. In one embodiment, the framework widgets 120 within a web page subscribe to the message queues for certain topics. The message broker 116 is responsible for routing the messages to the appropriate subscribers. Once a message is received by a client 102, the framework socket 150 distributes the message to each framework widget on the page with a corresponding subscription for the message. In other words, the framework socket 150 performs browser-side routing of messages, whereas the message broker 116 performs server-side routing of data messages to subscribers.

In one embodiment, the framework 110 supports various configurable message flows (e.g., STOMP, AMQP, etc.), allowing the framework 110 and framework widgets 120 to utilize various message brokers configured by different messaging protocols. In one embodiment, the different protocol based messaging flows may be utilized by framework 110 at the same time, depending on an environment in which the framework is deployed.

In one embodiment, the hub 124 is a plug-in driven reactor that resides outside of the web servers 112. The word reactor may also be thought of as a main event loop in an application. In one embodiment, the hub 124 has numerous plug-in applications, such as framework widgets 120 and/or applications 128. In one embodiment, the plug-in applications 128 may be producer or consumer applications.

A producer application is one that creates data. In one embodiment, a producer may be a polling producer. In one embodiment, the polling producer is implemented as a JAVA class that specifies certain polling functions (i.e, wake up every minute, get data every two minutes, transmit new data to message broker). The producer might define a poll method. In one embodiment, the hub 124 would then, based on the code, start the producer according to the requirements of the producer. If there are new message entries obtained by the producer method, the producer sends the message to the message broker 116. The producers (as well as the consumers) have connections to the message broker 116 that are utilized to send and receive messages with the message broker 116. The hub 124 is responsible for obtaining and distributing messages, churning on data, etc. as required by the plug-in applications 128 installed on the hub 124. The message broker 116 is responsible for routing the messages to appropriate client 102 rendering framework widgets with subscriptions to the topic for which the data message belongs.

A consumer application is one that handles or transforms data. For example, a consumer, which may be implemented as a JAVA class, consumes/subscribes to a topic and calls/executes a method when a message for that consumer arrives. In one embodiment, the hub 124 routes the message to the appropriate consumer.

In one embodiment, the hub 124 sits outside the web server 112. In one embodiment, the hub 124 exists on a separate server computer system to provide data processing for the applications 128. By processing data, running producer and consumer applications, etc. outside the web servers 112, the hub applications do not consume web server 112 resources. Furthermore, as discussed herein, the hub 124 obtains and transmits data messages without requiring actions on behalf of a user system (e.g., user web page request). Thus, the hub 124 also makes the framework-based web applications more efficient on the browser side by minimizing browser initiated requests and responses.

In one embodiment, the hub 124 further provides expert system-like functionality by providing applications programming interfaces (APIs) for interacting with a variety of knowledge bases (SQLALCHEMY models, resource connectors, caches, message queues, etc), creating framework widgets, and monitoring and processing incoming data. One could then easily build state-machines, inference engines, forward/backward-chaning rule-driven expert systems, etc.

In one embodiment, the framework widgets 120 are managed by the framework middleware 114 and the and the applications 128 are managed by the hub 124. In one embodiment, the framework middleware 114 loads the widgets 120 and applications 128 from storage of server computer systems of the framework 110. In one embodiment, when an application, such as applications 128 are to be integrated into the framework 110, the new plug-in application can be installed or plugged in anywhere on hub 124 utilizing a framework entry point. In one embodiment, the framework middleware 114 locates and finds the widgets and applications upon start-up, and loads the applications that have been registered at the entry points. Thus, with the framework 110, any plug-in can be installed as separate packages on the system utilizing package installation methods such as RPM package management of RED HAT. In one embodiment, the framework middleware 114 can also locate and use widgets and/or applications located externally to the framework 110, such as applications of the external resources 140. In one embodiment, the framework middleware 114 utilizes entry point registration of the external widgets and/or applications to locate and load the appropriate applications and framework widgets.

In one embodiment, framework middleware 112 also loads applications, such as applications 128 or framework widgets 120, In one embodiment, framework middleware 112 further loads, mounts, and exposes existing TURBOGEARS, PYLONS, or SWGI-compatible applications. Thus, various additional applications can be plugged into framework 110. In one embodiment, framework 110 can expose all installed applications via a link (e.g., via a universal resource locator such as /apps/myapp), and further make the applications available to pull in additional framework widgets for user in framework-based web applications, graphical user interface dashboards, framework widgets, etc.

In one embodiment, the framework 110 further includes a cache memory 122 and databases 118. In one embodiment, the cache memory 122 is a temporary memory that may be used and accessed by the hub 122 and the live widgets 120. In one embodiment, the databases 118 may be utilized by applications installed on the framework 110. In one embodiment, applications can specify a particular database, from databases 118, to be used by the app. If no database is installed or selected, in one embodiment, the framework middleware 114 will create a database for the application.

As discussed above, the framework provides a highly scalable platform for creating web page user interfaces that include live/real-time framework widgets. Furthermore, because the framework sockets, proxies, and framework middleware provide protocol abstractions and protocol translation abilities, the framework makes it simple for framework widgets to extract and extend data from arbitrary resources in an intuitive and efficient manner. In the embodiments discussed above, the framework incorporates various components such as PYTHON, ORBITED, AMQP, WSGI, etc. Framework applications may be written using stable pre-existing modules for these components, which can be either exposed on the framework or provided via other means, to enable the rapid creation of powerful applications utilizing framework widgets. Furthermore, the framework widgets, when combined with the hub and message broker(s) enable services to create, publish, and subscribe to arbitrary message streams.

In order to more fully explain the framework 110 and architecture for providing real-time web applications, discussed above, embodiments of system work flows are discussed in greater detail below with respect to FIGS. 2-4.

Figure 2:
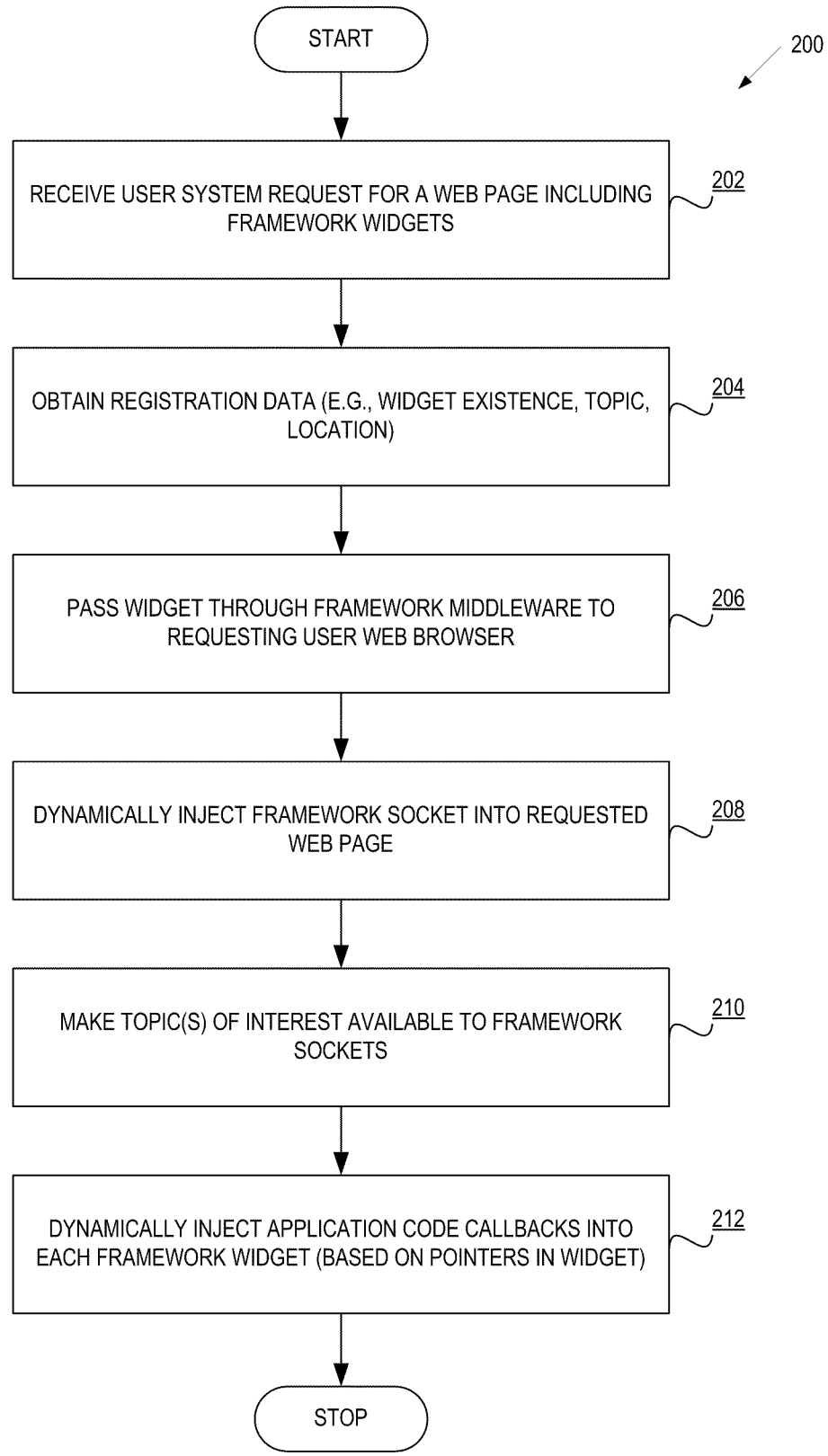
FIG. 2 is a flow diagram of one embodiment of a method for providing a web page including a framework widget registered with a real-time web application framework.

FIG. 2 is a flow diagram of one embodiment of a method 200 for providing a web page including a framework widget registered with a real-time web application framework. The method 200 is performed by processing logic that may comprise hardware (circuitry, dedicated logic, etc.), software (such as is run on a general purpose computer system or a dedicated machine), or a combination of both. In one embodiment, the method 200 is performed by a real-time web application framework (e.g., framework 110).

Referring to FIG. 2, the process begins by receiving a user system web browser request at web server 112 for a web page including framework widgets 120 (processing block 202). In one embodiment, the request is a normal web page request received by web servers 112.

In one embodiment, framework middleware 114 obtains registration data (e.g., widget existence, topic subscriptions, location) corresponding to framework widgets 120 that are to be rendered in a web page (processing block 204). In one embodiment, framework 110 finds all framework widgets and renders them on web servers 112 into HTML, JAVASCRIPT, CSS, etc. along with the rest of the requested web page.

Web servers 112 pass the framework widgets 120 through the framework middleware 114 to the requesting client 102 (processing block 206).

Framework middleware 114 dynamically injects a framework socket 150 into requested web page (processing block 208). In one embodiment, the framework socket is a live socket that abstracts the TCP protocol and opens a connection with framework proxies, such as proxies 126. In one embodiment, the connection is a persistent connection between the clients 102 and message broker 116. In one embodiment, the framework widgets 120 register their existence with framework middleware 114 before the framework socket 150 is injected into the web page. The framework socket 150 then uses the framework widget 120 registration information when rendering itself.

Framework middleware 114 makes topics of interest available to the framework sockets 150 (processing block 210). In one embodiment, the framework middleware 114 makes the data available to the framework sockets 150 when the framework sockets 150 are rendering.

Framework middleware 114 dynamically injects application code callbacks into each framework widget (processing block 212). In one embodiment, as discussed in greater detail below, framework widgets include pointers to callback functions. In one embodiment, a callback function is a snippet of JAVASCRIPT code that performs additional processing on a received data message. For example, a framework widget that is to display a list of feeds received from a news site, may receive feed data and then execute callbacks which prepend the new data to a feed list, animates the display of the new feed, highlights the new feed, etc. In one embodiment, the framework widget includes pointers to the callback functions to be executed by the framework widget, and processing logic utilizes these pointers to locate and dynamically inject the callbacks into the framework widget as it is delivered to a client. In one embodiment, the callback code is stored within the framework. In another embodiment, the callback code is stored in a location remote from the framework.

Figure 3:
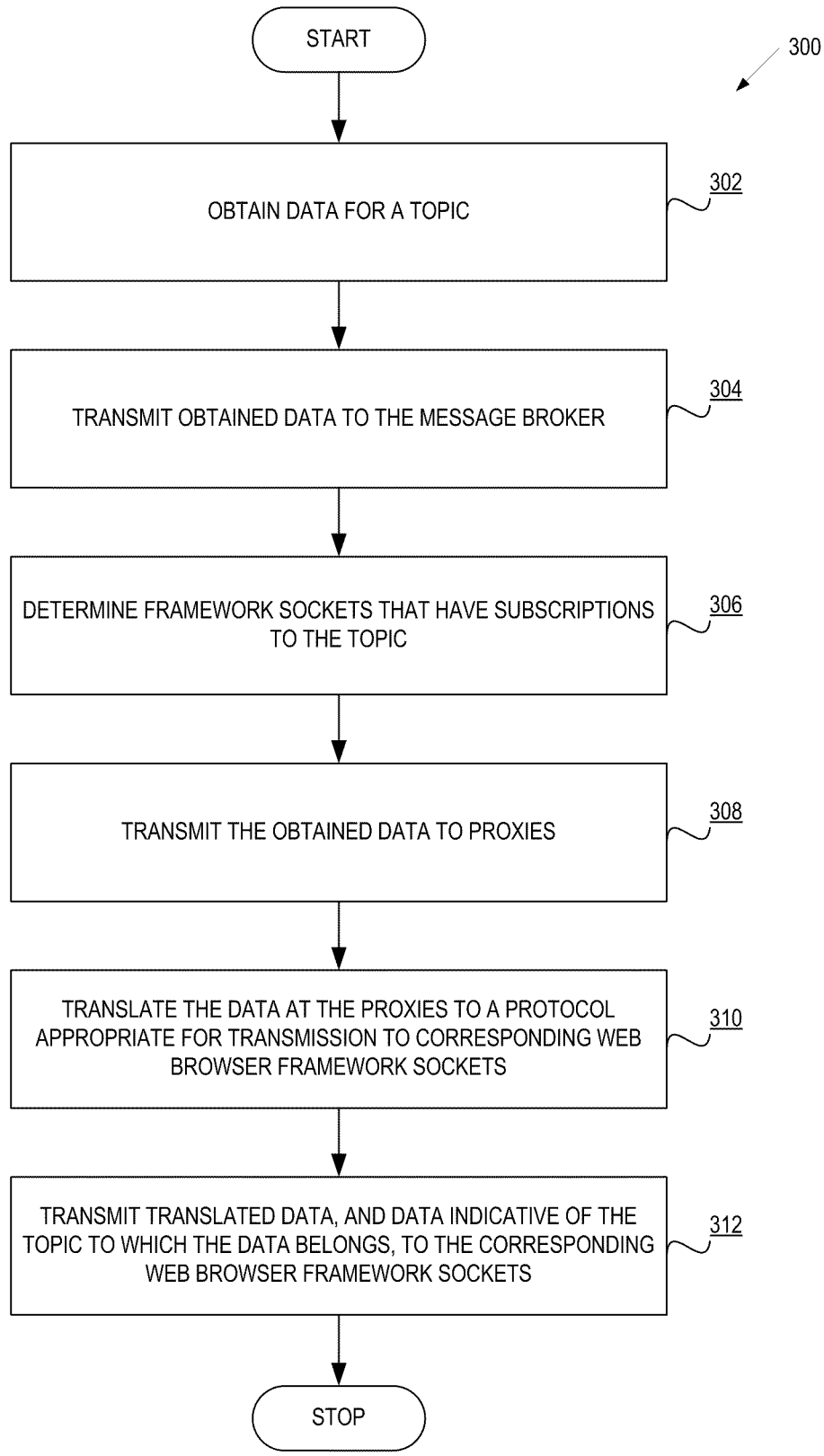
FIG. 3 is a flow diagram of one embodiment of a method for a real-time web application framework obtaining and distributing messages to clients.

FIG. 3 is a flow diagram of one embodiment of a method 300 for a real-time web application framework obtaining and distributing messages to clients. The method 300 is performed by processing logic that may comprise hardware (circuitry, dedicated logic, etc.), software (such as is run on a general purpose computer system or a dedicated machine), or a combination of both. In one embodiment, the method 300 is performed by a real-time web application framework (e.g., framework 110).

Referring to FIG. 3, the process begins by an application 128 run by the hub 124 obtaining data for a topic (processing block 302). As discussed above, a topic is an abstraction of a messaging queue. In one embodiment, the application is a producer application that is loaded and run by the hub according to configuration parameters of the application. For example, the producer application may specify that it is to be run every N minutes in order to check for new data for a particular topic. The application would then be awoken by the hub to poll a data source for new data. When new data is available, the application obtains the data for distribution via the framework.

The application 128 run in the hub 124 transmits the obtained data to a message broker (processing block 304). In one embodiment, the application run on the hub transmits newly acquired data to the hub as the data becomes available. In one embodiment, the message broker may be a STOMP protocol-based message broker, an AMQP protocol-based message broker, or any other type of message broker. Furthermore, processing logic may be configured to communicate with various message brokers according to various communications protocols. In one embodiment, processing logic translates the data message to a format appropriate for the intended message broker.

The message broker 116 determine framework sockets that have subscriptions to the topic (processing block 306). In one embodiment, the message broker determines what framework sockets, and thus web browsers, should receive the data based on framework widget subscriptions. As discussed above, the topic subscriptions are registered with the framework and passed to the message broker when a framework widget is provided to a web browser in a requested web page.

In one embodiment, the message broker may then use the subscriptions to determine where to send newly received data messages, the recipient framework socket connection, etc.

Message broker 116 transmits the obtained data to proxies 126 (processing block 308). In one embodiment, the message broker 116 transmits the data messages to the proxies 126 when the proxies 126 has an open connection established with the message broker 116. Furthermore, in one embodiment, the message broker 116 transmits the message when a corresponding framework socket 150 has subscribed to a topic that the message is for.

The proxies 126 then translates the data to a protocol appropriate for transmission to corresponding web browser framework sockets (processing block 310). In one embodiment, the proxies 126 create socket connections between the clients 102 and the message broker 116. In one embodiment, the proxies 126 encapsulates data messages sent between the message broker 116 and the clients 102 in a protocol for transmission to and from the browser.

In one embodiment, the proxies translate the message from a STOMP or AMQP protocol formatted message to a communications protocol supported by a receiving web browser, such as a FIREFOX, INTERNET EXPLORER, OPERA, etc. web browser. In another embodiment, the proxies may not need to translate the data prior to transmission to a web browser. In one embodiment, protocol translation can be handled by a framework socket.

Proxies 126 transmit the translated data, and data indicative of the topic to which the data belongs, to the corresponding framework sockets 150 (processing block 312). In one embodiment, proxies 126 establish a raw connection between clients 102 and external resources 140. In another embodiment, proxies 126 utilize the subscriptions, registered with the framework and known to the message broker, to determine what framework widgets rendered in clients and have subscriptions to the topic corresponding to the data message. That is, for example, a data message may be ready for transmission to all framework widgets that have corresponding topic subscriptions. Note that different framework widgets (e.g., a real-time graph widget, a news feed widget, a dashboard widget, etc.) may all have subscriptions to the same topic even though the widgets themselves are different and execute potentially different callback functions. In one embodiment, the proxies utilize the subscription data registered with the framework to send the data messages to the appropriate clients for each of the framework widgets with an appropriate topic subscription.

Figure 4:
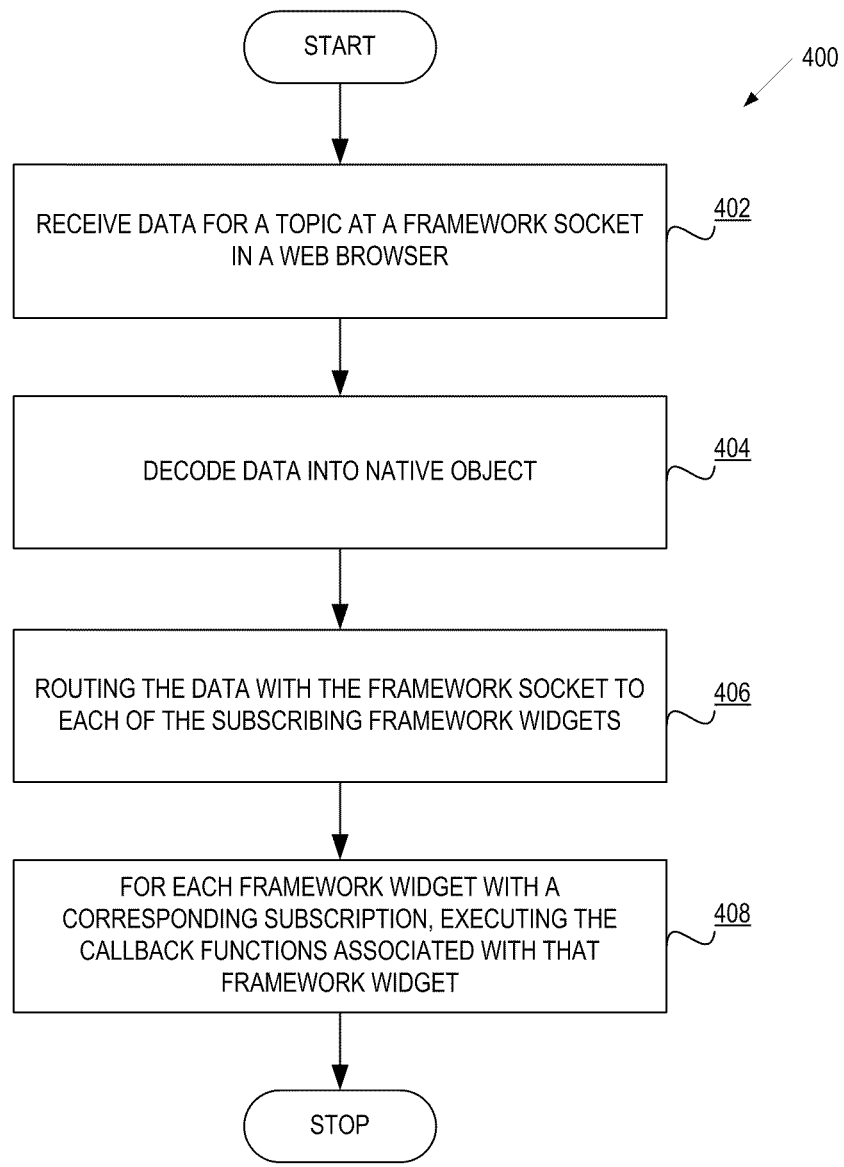
FIG. 4 is a flow diagram of one embodiment of a method for a framework socket and a client to process an incoming data message for a given topic.

FIG. 4 is a flow diagram of one embodiment of a method 400 for a framework socket and a client to process an incoming data message for a given topic. The method 400 is performed by processing logic that may comprise hardware (circuitry, dedicated logic, etc.), software (such as is run on a general purpose computer system or a dedicated machine), or a combination of both. In one embodiment, the method 400 is performed by a client and framework socket interacting with a real-time web application framework (e.g., framework socket 150 and client 102).

Referring to FIG. 4, the process begins with framework socket 150 receiving data for a topic at a framework socket rendered in a web browser (processing block 402). As discussed above, in one embodiment, the data is received from a proxy 126 and includes data indicative of a topic to which the data message belongs. In one embodiment, the data is received in a framework socket 150 which has a live and open connection to the message broker 110 via the proxy 126. Furthermore, the framework socket 150 is a live socket that was opened within a web browser run by client 102 in response to the client's 102 request for a web page including framework widgets.

In one embodiment, framework socket 150 decodes the received data into a native data object (processing block 404). In one embodiment, framework socket 150 decodes raw data into native objects because there are potentially many protocols layered on top of each other between the framework widgets rendered in a web browser and the message broker 116. In one embodiment, the framework socket 150 decodes STOMP or AMQP data messages, before further decoding the data and routing messages to framework widgets, as discussed below. While the proxies 126 ensure that data messages sent from message broker 116 are delivered to clients 102 in tact, the framework socket 150 translates the data messages to and from the users web browser run on client 102.

Framework socket 150 routes the data to each of the subscribing framework widgets (processing block 406). In one embodiment, as discussed above, the framework socket 150 performs browser-side routing of the data to the subscribing widgets in a web page. In one embodiment, prior to routing the data to the appropriate framework widgets, the framework socket 150 may further perform data translation to format the data for receipt by a target framework widget. In one embodiment, framework socket 150 is rendered with key/value pairs of topics and widget callbacks. When framework socket 150 has received a data message from the framework 110, framework socket 150 iterates over the widget callbacks. In one embodiment, framework socket 150 is rendered with a dictionary object that contains the key/value pairs, and iterates over all callbacks in the dictionary.

For each framework widget with a corresponding subscription, framework socket 150 executes the callback functions associated with that framework widget (processing block 408). In one embodiment, as will be discussed in greater detail below, framework widgets may include callback functions that perform additional processing of a received data message. The additional processing may include formatting the received data, performing graphical user interface operations (e.g., displaying the data, animating the data, updating the framework widget with the new data, etc.).

The following example further illustrates the processes described above, with respect to FIGS. 2-4. The web servers 112 receive web page requests from clients 102. These requests are passed trough the framework middleware 114 to obtain framework widgets 120 which are to be embedded in the requested web content. Suppose that 3 framework widgets are to be included in the web content requested by the user, the widgets are returned via the framework middleware 114 of the web server 112 and transmitted to the client 102 via the network/internet 104. The web content including the framework widgets is rendered in a web browser run by the client 102. More specifically, when a user requests a web page with a live graph (e.g., a framework widget that enables a live graph user interface component), the graph framework widget is returned and rendered to the user by a client 102.

As discussed above, the real-time web application framework includes and utilizes framework widgets for the development and deployment of real-time web applications. In one embodiment, framework widgets leverage a library of web application code. In one embodiment, the library is the standard TOSCAWIDGETS widget framework. In one embodiment, a widget is a reusable web component or class that bundles CSS, stylesheets, JAVASCRIPT, HTML, XML, etc. to provide a graphical user interface element and/or web application. In one embodiment, the framework widget is a graphical user interface web component, such as a graph, chat interface, display for data feeds, etc.

Figure 5:
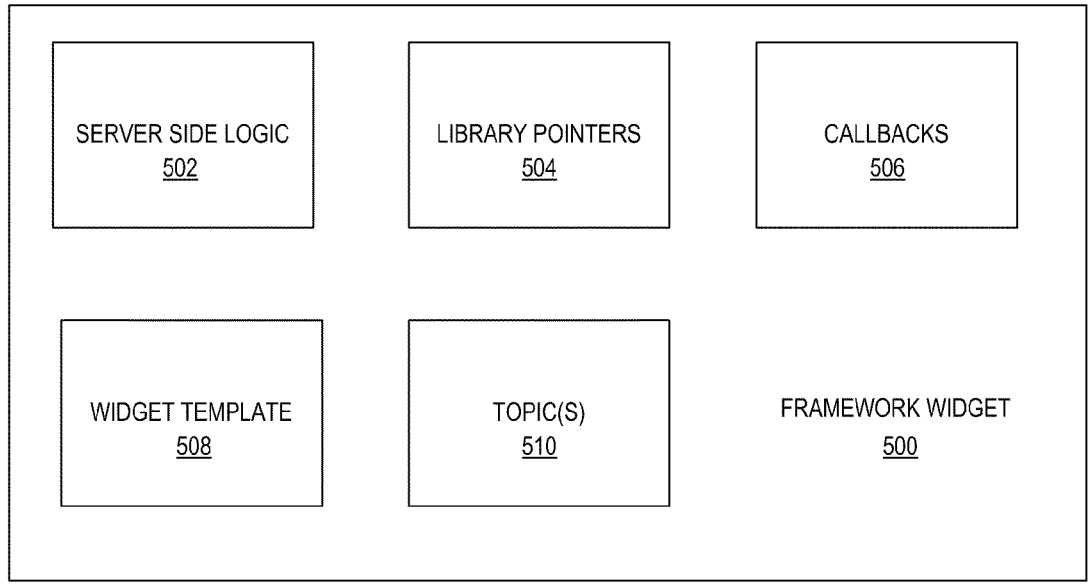
FIG. 5 is a block diagram of one embodiment of a framework widget.

FIG. 5 is a block diagram of one embodiment of a framework widget 500. In one embodiment, the framework widget includes pointers 504 to application code libraries. In one embodiment, the pointers 504 enable the framework middleware to obtain, for example, JAVASCRIPT that is to be executed as a function of the widget. The actual code, stylesheet, CSS template, etc. are not included within 500 framework widget when it is created by an applications programmer or when it is stored on the framework. Rather the framework widget includes pointers 504 to these elements stored in a storage of the framework, and the pointers enable the framework middleware to efficiently inject the callback 506 corresponding to the pointers 504 into the framework widget as the widget is supplied to a client. As discussed above, the callbacks determine how a framework widget reacts to and processes message data when the message data is received.

In one embodiment, framework middleware dynamically injects the callbacks 506 into each widget as the widgets are provided to user systems. In one embodiment, the pointers 504 contained within a widget are utilized by the middleware to locate and inject the appropriate application logic stored in a library of the web servers into the widget. Thus, a widget may be an abstractly defined web component that points to, and relies upon, more complex application logic stored by the web servers in order to execute the programmer-defined functions of the widget. The middleware would then dynamically create the functional widget as it is provided to a user system on the way out of the middleware.

In one embodiment, each widget further includes server-side logic 502. In one embodiment, the server-side logic is logic that a web server is to run each time the widget is rendered to a user system. In one embodiment, the server-side logic 502 is extracted from the framework widget as the framework widget is passed to a client.

In one embodiment, the framework widget 500 includes a topic subscription or a list of topic subscriptions 510. As discussed above, a topic is an abstraction that represents a message queue (i.e., a STOMP message queue or an AMQP message queue). In one embodiment, each topic is a message queue abstraction that the framework widget is to subscribe to, and with the callback functions consume data messages received from the framework resulting from the subscription. More particularly, a topic includes data that points to a message queue, which the framework widget points to at the message broker (with STOMP, the message queue subscription is a destination/location; with AMQP the message queue subscription is a particular messaging queue or exchange or routing key). For example, a framework widget may specify that the widget is to subscribe to an RSS news feed. As other examples of topic subscriptions, which are merely illustrative of possible topic subscriptions and do not limit the number or type of topics that a framework widget may subscribe to, include subscriptions to financial data, web chat, CPU resource consumption data, etc. In one embodiment, the topic is an abstraction of a message queue because the topic points to the message queue at the message broker. In one embodiment, the framework socket discussed herein is responsible for translating protocols between the framework widget and a particular message queue/broker.

In one embodiment, the framework widget further includes one or more callback functions 506. In one embodiment, the callback functions are JAVASCRIPT functions that are to be run in a user system web browser each time data is received for the subscription. In one embodiment, the callback functions 506 are additional handling processes for data received by a framework widget 500. As discussed above, the callback functions 506 are dynamically injected into the framework widget 500 by the framework middleware when the framework widget 500 is passed to a client.

For example, a framework widget listens/subscribes to an RSS feed. As discussed herein, an application running on the framework hub periodically checks for new data at the source of the subscribed RSS feed. The hub would distribute messages to the message broker, which then responds to the user systems that include framework widgets subscribing to the RSS feed messages (e.g., a CNN news feed). When a new message is received by a framework widget, the callbacks further process the incoming data. In the example, when new feed data is received for the subscription, the callbacks may add the feed to the top of a displayed list and slide the list down, animate the addition of the new feed, highlight the new feed etc.

In one embodiment, the callback functions 506 for a framework widget 500 are run in real time whenever data is provided to that widget. In one embodiment, the callback functions 506 are implemented as snippets of JAVASCRIPT code that the middleware wraps around a function embedded in the framework widget 500, which takes a data message as input. Because the snippet is automatically wrapped by the framework, a developer may supply any code they desire to handle topic data.

In one embodiment, a software developer may further customize a framework widget by overriding widget template argument 508 for the framework widget 500 by including further specifications as to CSS, JAVASCRIPT, etc. to impact the manner in which a framework widget is displayed and/or behaves when rendered in a web browser.

In one embodiment, as discussed above, the framework integrates with one or more message brokers. In one embodiment, the framework includes logic to both connect and communicate with various message brokers utilizing communications protocols supported by each particular message broker. For example, the framework hub and the framework middleware include applications that enable each to communicate with a preexisting or new message broker. For example, the hub and/or middleware are able to communicate via a STOMP-based communications protocol to a STOMP message broker, or via an AMQP based communications protocol to an AMQP message queue. In one embodiment, the STOMP and AMQP communications protocols are standardized messaging protocols.

Figure 6:
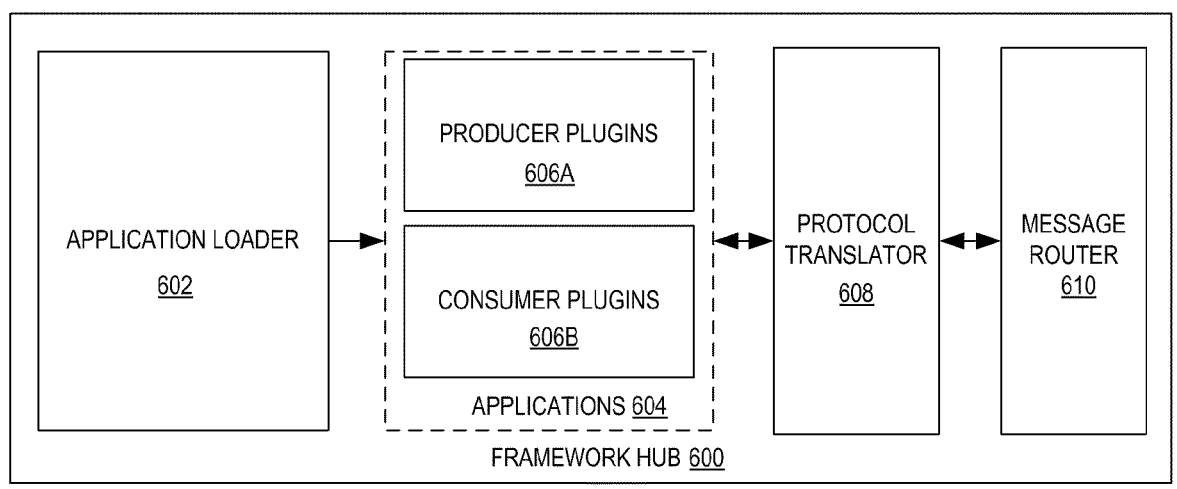
FIG. 6 is a block diagram of one embodiment of a hub in a real-time web application framework.

FIG. 6 is a block diagram of one embodiment of a hub 600 in a real-time web application framework. In one embodiment, hub 600 includes application 604. In one embodiment, the framework hub is plug-in driven and sits outside of the web stack and/or resides on a separate computing device entirely. In one embodiment, the framework hub is referred to as plug-in driven because the hub gains its functionality for delivering live and real-time messages to framework widgets when applications 604 are installed on the hub as plug-ins. In one embodiment, each application installed on the hub is installed at an entry-point (not shown) of the hub utilizing a package-based installation method, discussed below. In one embodiment, when the framework hub is started, the application loader 602 utilizes the entry points to load all applications 604 installed on the hub.

In one embodiment, applications take the form of producer plug-ins 606A and consumer plug-ins 606B. In one embodiment, each producer plug-in 606A application is an application plug-in that performs a function to generate data for the framework. For example, a producer function might wake up, get data by polling an external resource, and sending obtained data as messages to a message broker. In one embodiment, a consumer plug-in 606B application is also an application plug-in, but instead of generating data, consumes and/or transforms data into another state. For example, a consumer function might wake up, receive data from a producer function, perform a function to transform the data, and provide the data back to the consumer function for further processing.

In one embodiment, similar to a framework widget, each of the producer plug-ins 606A and consumer plug-ins 606B specify a topic or list of topics to which the application corresponds. In one embodiment, the hub handles connecting and subscribing to topics, and routing subscription messages generated by the plug-in application to the appropriate framework widgets.

In one embodiment, each plug-in 606A and 606B is installed on the hub utilizing a package installation mechanism. In one embodiment, the installation mechanism is a real package management (RPM) file format installation for installing and removing programs. In another embodiment, a PYTHON egg package is utilized. Once installed, each plug-in sits on an entry point where the program exists on the framework hub (e.g., exemplary installation locations/entry points within the hub are framework.consumer, framework.producer, framework.app entry points, or any other entry point of the hub specified by a package installer).

In one embodiment, when the framework hub is started, the application loader 602 queries the entry points associated with applications 604. In one embodiment, each entry point points to a framework component, such as a producer, consumer, framework widget, etc. In one embodiment, the application loader 602 of hub 600 iterates over all entry points to load and instantiate instances of each application associated with all of the entry points.

After all applications are loaded, the producer plug-ins 606A and consumer plug-ins 606B are run by the messaging hub outside of the web stack. That is, the applications that are run by the framework hub do not consume compute cycles of the web stack and/or web servers. Furthermore, as discussed above, because the producers and consumers automatically provide their functions (i.e., wake up and check for data), a user computer system need not devote computation resources to make a request, nor a server need not devote computation resources to answering a request. Rather, the hub 600 performs data producer and consumer functions independent of the web server.

Hub 600 also includes protocol translator 608. In one embodiment, protocol translator 608 obtains the output of applications 604 and translates the format of the data, by decoding and re-encoding the data, as necessary. For example, a producer plug-in may output data in a particular format. When the data is to be delivered to an AMPQ-based message queue, protocol translator 608 reformats any data messages to a form that the message queue can understand.

In one embodiment, framework hub 600 connects to, and communicates with framework databases, such as databases 118, utilizing protocol translator 608. In another embodiment, framework hub 600 may include separate protocol translators for routing messages and for communicating with databases.

Hub 600 further includes message router 610. In one embodiment, message router 610 is responsible for receiving the reformatted messages, which were generated by applications 604 and translated by protocol translator 608, and routing the messages to the appropriate message broker. In one embodiment, the appropriate message broker is encoded within the translated message. In another embodiment, the appropriate message broker is defined based on the format of the message itself (e.g., STOMP messages are routed to a STOMP message system and AMQP messages are routed to an AMQP message queuing system).

Figure 7:
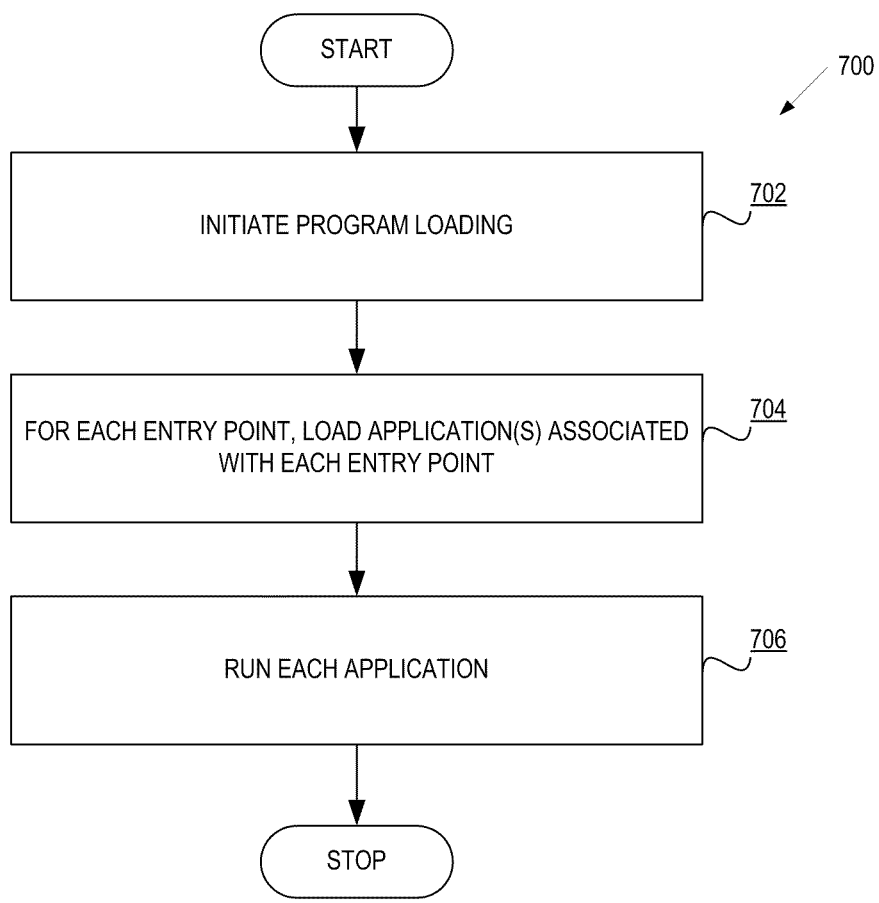
FIG. 7 is a flow diagram of one embodiment of a method for a hub of a real-time web application framework installing and running plug-in applications.

FIG. 7 is a flow diagram of one embodiment of a method 700 for a hub of a real-time web application framework installing and running plug-in applications. The method 700 is performed by processing logic that may comprise hardware (circuitry, dedicated logic, etc.), software (such as is run on a general purpose computer system or a dedicated machine), or a combination of both. In one embodiment, the method 700 is performed by a real-time web application framework hub (e.g., hub 124).

Referring to FIG. 7, processing logic begins by initiating program loading (processing block 702). As discussed above, various applications may be installed on the hub of a real-time application framework. The applications may be developed according to various programming language, such as PYTHON, and installed on entry points, discoverable by the hub, utilizing an RPM package installation mechanism. In one embodiment, these packages contain "Python Egg" metadata that enables applications to plug into the framework entry points, which the framework utilizes to discover any installed applications. In one embodiment, the program loading is initiated upon start-up of a framework hub.

Each application associated with an entry point is loaded by processing logic (processing block 704). In one embodiment, processing logic of a hub loads all plug-in application that are installed on the entry points of a framework hub. The entry points are locations where the application resides and can be loaded from the hub.

Processing logic then runs each application that was loaded (processing block 706). In one embodiment, the applications are run according to one or more configuration parameters of the application.

Figure 8:
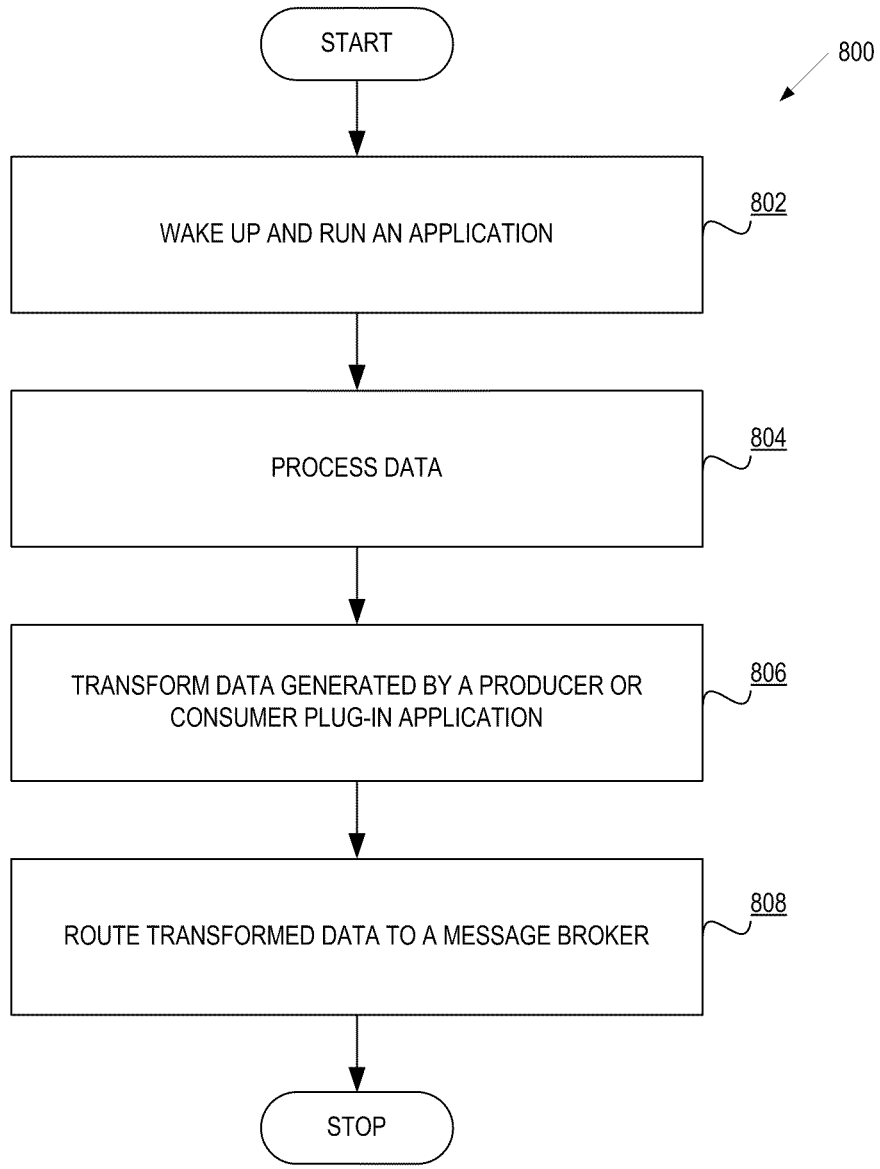
FIG. 8 is a flow diagram of one embodiment of a method for a hub of a real-time web application framework to run a plug-in application.

FIG. 8 is a flow diagram of one embodiment of a method 800 for a hub of a real-time web application framework to run a plug-in application. The method 800 is performed by processing logic that may comprise hardware (circuitry, dedicated logic, etc.), software (such as is run on a general purpose computer system or a dedicated machine), or a combination of both. In one embodiment, the method 800 is performed by a real-time web application framework hub (e.g., hub 124).

Referring to FIG. 8, processing logic begins by waking up and running an application (processing block 802). In one embodiment, processing logic executes applications according to a configuration of the application. As discussed above, the applications executed by the hub may be consumer plug-in applications or producer plug-in applications. For example, a producer plug-in installed on the framework hub may be configured to wake up every 10 minutes to search a financial website for data on the stock market. In one embodiment, processing logic of the hub would wake up and run the application to obtain the financial data on the specified schedule.

Processing logic processes any new data (processing block 804). In one embodiment, when new data is available, a producer plug-in application obtains the data from the source (e.g., polls CNN FINANCIAL to obtain stock market figures). Processing logic would then transform the data generated or consumed by the plug-in and route the data message to a message broker (processing blocks 806 and 808). In one embodiment, processing logic outputs the data to a protocol translator, which encapsulates the data in a format appropriate for a given topic (e.g., message queue). After the format of the message is translated, it is forwarded by a message router to an appropriate message broker specified by the topic in the plug-in.

In one embodiment, when the framework middleware loads for the first time, the middleware loads all applications and widgets in the framework. In one embodiment, the framework middleware utilizes application entry point registrations to locate which applications are to be loaded. The middleware then waits for requests to be received.

When the framework middleware receives a request, the framework middleware passes the request to the application(s) within the webstack that are the subject of the request. For example, suppose the application is to render a framework widget. The framework middleware would render the framework widget on the server.

In one embodiment, the framework widget registers itself and existence (as discussed above) with the framework middleware. In one embodiment, the registration performed by the framework widget involves the framework widget informing the middleware of the widget's existence, a topic or list of topics the widget subscribes to, and other basic information about itself (i.e., location of the widget, identification data, etc.).

In one embodiment, a framework socket is also a framework widget. In one embodiment, the framework socket is a communications interface rendered on a client along with any other framework widgets served in response to a user request. In one embodiment, the framework socket is an abstraction that enables a TCP socket to the server to be created within a user's web browser that creates a live and continuously open connection back to the web servers. After the framework socket is rendered in the user's web browser, the framework socket communicates with the middleware to determine what other framework widgets are being rendered, to automatically connect through the proxies, and to subscribe to topics that each widget is related to.

For example, a user system requests a web page with a framework widget. As the framework widget is being passed through the middleware to the user system, the framework widget registers itself with the middleware and renders as HTML, etc. In one embodiment, as the web page, including the framework widget is supplied to the user system, the framework middleware dynamically injects the framework socket into the request web page. In one embodiment, the framework socket is rendered and generates code that will subscribe to all message topics of the framework widgets within the page. Furthermore, the framework socket injects the widget callbacks. As discussed above, in one embodiment, a framework widget includes at least one topic (e.g., an abstracted message queue) that the widget subscribes to, and corresponding callback functions that operate on received topic data. In one embodiment, the socket injects JAVASCRIPT code for the callbacks that is performed each time messages from the topic are received by the framework socket. When the framework socket is rendered on the server, before it goes back to the user system, the framework socket subscribes to all of the topics. The framework socket further places the framework widget callbacks into itself to enable the framework socket to perform browser-side routing of data message (e.g., to distribute topic data to the appropriate widgets in a web page).

In one embodiment, the framework socket may be thought of as a user system side router for topic data and callbacks. In one embodiment, the framework socket may be one of two types of framework sockets. In one embodiment, the framework socket is a STOMP protocol socket for publication and subscription. In another embodiment, the framework socket is a AMQP protocol socket for sending and receiving data through the proxies to the message broker. In one embodiment, the framework includes a configuration file, stored and utilized by the middleware stack, which can be configured to specify which type of framework socket is utilized. In one embodiment, the type of framework socket may be set by an administrator of the framework. In another embodiment, the framework socket is given a default value, such as the AMQP protocol socket.

In one embodiment, the framework socket is an abstraction that utilizes a socket to subscribe to topics (e.g., message queues). In one embodiment, the framework middleware enables acquisition of widgets and application directly from the framework. The plug-ins, framework widgets, and applications are exposed via the framework to enable other user systems to access the widgets and applications, utilize them in user created framework-based web content, etc.

Figure 9:
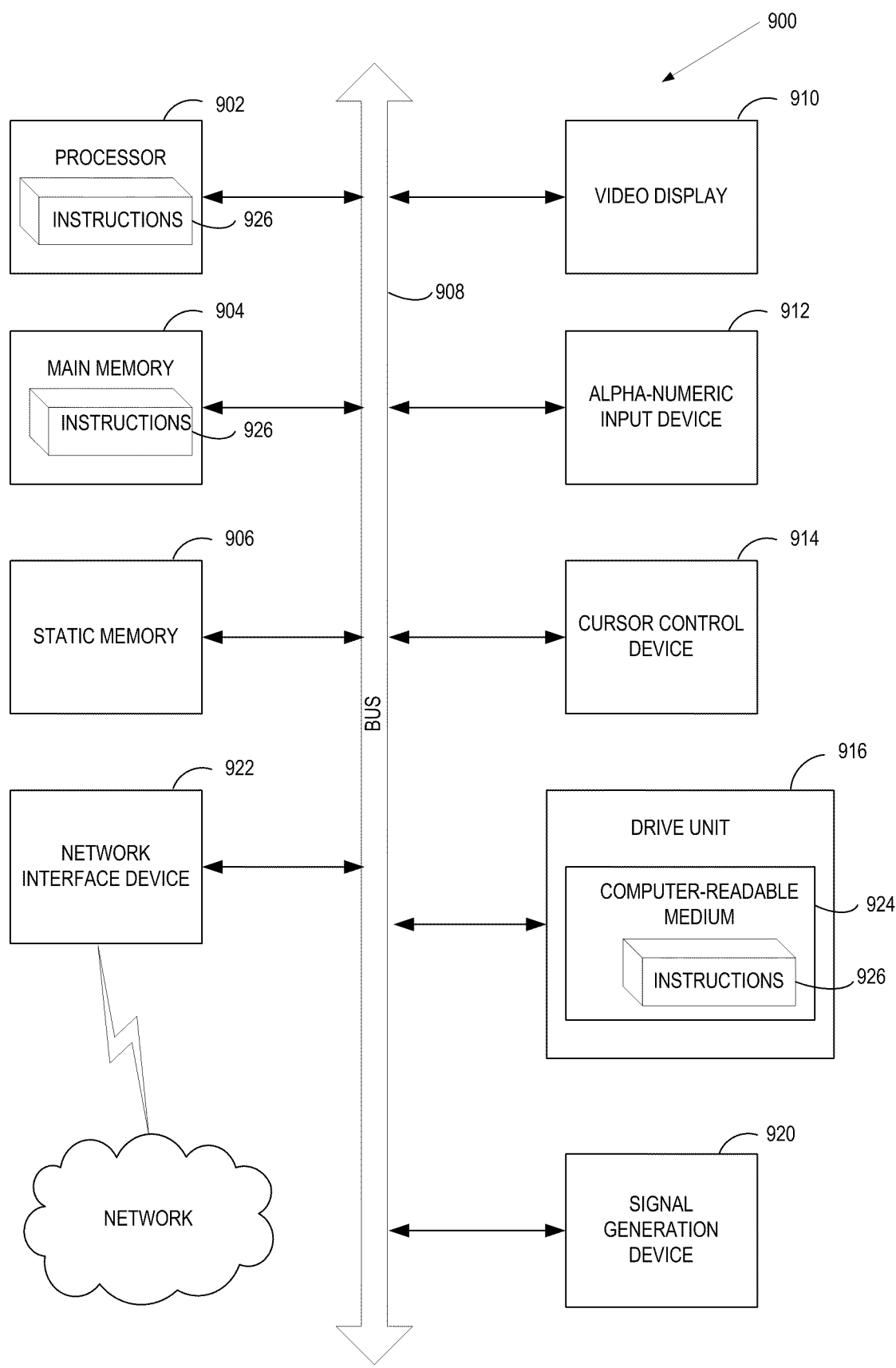
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 930 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-accessible storage media. The software 922 may further be transmitted or received over a network 920 via the network interface device 908.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A method comprising:
   obtaining, by a processing device of a server computer system, data for a topic associated with a message queue;
   identifying, by the processing device, a client rendering a framework widget corresponding to a client web application, the framework widget to subscribe to the message queue for the topic; and
   transmitting, by the processing device to the client without the client requesting an update for the client web application, a message comprising the topic data, wherein the message to enable the framework widget to process the data and to update the client web application using the data.

2. The method of claim 1, further comprising:
   receiving a request from the client for a web page comprising the framework widget, the widget comprising a subscription to the topic; and
   dynamically injecting a framework socket into the requested web page prior to delivery to the client, the framework socket creating an open communications pathway between the client and a message broker.

3. The method of claim 2, further comprising:
   transmitting a message associated with a subscription using the dynamically injected framework socket.

4. The method of claim 2, further comprising:
   dynamically injecting application code into the framework widget while the framework widget is transmitted to the client.

5. The method of claim 4, wherein the dynamically injected application code corresponds to one or more pointers, stored by the framework widget, that point to snippets of logic stored by a real-time web application framework.

6. The method of claim 4, wherein the application code comprises logic for the display of the received message.

7. The method of claim 1, further comprising:
   receiving the message comprising the data at a framework socket open in a client, the framework socket enabling a live communications link between the framework widget and a message broker;
   determining one or more framework widgets displayed in a web page with subscriptions to the topic; and
   routing, by the framework socket, the message comprising the data to only the framework widgets with corresponding topic subscriptions.

8. The method of claim 7, further comprising
   responsive to receiving the message routed by the framework socket, executing one or more callback functions to process the data message.

9. The method of claim 1, wherein the data is obtained by a hub of a real-time web application framework, the hub executing plug-in applications outside of a web stack managed by the real-time web application framework.

10. The method of claim 1, wherein the message is transmitted to the client in real-time and without receiving a request from the web browser for the data.

11. A non-transitory computer readable storage medium that provides instructions, which when executed on a processing device cause the processing device to perform a method comprising:
    obtaining, by the processing device of a server computer system, data for a topic associated with a message queue;
    identifying, by the processing device, a client rendering a framework widget corresponding to a client web application, the framework widget to subscribe to the message queue for the topic; and
    transmitting, by the processing device to the client without the client requesting an update for the client web application, a message comprising the topic data, wherein the message to enable the framework widget to process the data and to update the client web application using the data.

12. The non-transitory computer readable storage medium of claim 11, further comprising:
    receiving a request from a client for a web page comprising the framework widget, the widget comprising a subscription to the topic; and
    dynamically injecting a framework socket into the requested web page prior to delivery to the client, the framework socket creating an open communications pathway between the client and a message broker.

13. The non-transitory computer readable storage medium of claim 12, further comprising:
    transmitting a message associated with a subscription using the dynamically injected framework socket.

14. The non-transitory computer readable storage medium of claim 12, further comprising:
    dynamically injecting application code into the framework widget while the framework widget is transmitted to the client.

15. The non-transitory computer readable storage medium of claim 14, wherein the dynamically injected application code corresponds to one or more pointers, stored by the framework widget, that point to snippets of logic stored by a real-time web application framework.

16. The non-transitory computer readable storage medium of claim 14, wherein the application code comprises logic for the display of the received message.

17. The non-transitory computer readable storage medium of claim 11, further comprising:
receiving the message comprising the data at a framework socket open in a client, the framework socket enabling a live communications link between the framework widget and a message broker;
determining one or more framework widgets displayed in a web page with subscriptions to the topic; and
routing, by the framework socket, the message comprising the data to only the framework widgets with corresponding topic subscriptions.

18. The non-transitory computer readable storage medium of claim 17, further comprising
responsive to receiving the message routed by the framework socket, executing one or more callback functions to process the data message.

19. The non-transitory computer readable storage medium of claim 11, wherein the data is obtained by a hub of a real-time web application framework, the hub executing plug-in applications outside of a web stack managed by the real-time web application framework, and wherein the message is transmitted to the client in real-time and without receiving a request from the web browser for the data.

20. A system, comprising:
a memory;
a processing device coupled with the memory; and
an application framework executed from the memory by the processing device, the application framework to:
obtain data for a topic associated with a message queue;
identify a client rendering a framework widget corresponding to a client web application, the framework widget to subscribe to the message queue for the topic; and
transmit a message to the client without the client requesting an update for the client web application, the message comprising the topic data, wherein the message is to enable the framework widget to process the data and to update the client web application using the data.

21. The system of claim 20, wherein the application framework further to:
receive a request from the client for a web page comprising the framework widget, the widget comprising a subscription to the topic; and
dynamically inject a framework socket into the requested web page prior to delivery to the client, the framework socket creating an open communications pathway between the client and a message broker.

22. The system of claim 20, wherein the application framework further to:
receive the message comprising the data at a framework socket open in a client, the framework socket enabling a live communications link between the framework widget and a message broker; and
determine one or more framework widgets displayed in a web page with subscriptions to the topic;
wherein the framework socket to route the message comprising the data to only the framework widgets with corresponding topic subscriptions.

* * * * *